United States Patent
Bleeker (10) Patent No.: US 8,713,944 B2
(45) Date of Patent: May 6, 2014

(54) HIGH TEMPERATURE MANIFOLDS FOR GAS TURBINE ENGINES

(75) Inventor: Daniel E. Bleeker, Ankeny, IA (US)

(73) Assignee: Delavan Inc., West Des Moines, IA (US)

( * ) Notice: Subject to any disclaimer, the term of this patent is extended or adjusted under 35 U.S.C. 154(b) by 895 days.

(21) Appl. No.: 12/889,275

(22) Filed: Sep. 23, 2010

(65) Prior Publication Data

US 2012/0073299 A1     Mar. 29, 2012

(51) Int. Cl.
*F02C 1/00*     (2006.01)

(52) U.S. Cl.
USPC ............................................. 60/739; 60/740

(58) Field of Classification Search
USPC ............................ 60/734, 739, 740, 746–747
See application file for complete search history.

(56) References Cited

U.S. PATENT DOCUMENTS

| | | | | |
|---|---|---|---|---|
| 2,121,624 | A | * | 6/1938 | Cowles ........................ 285/256 |
| 2,787,289 | A | * | 4/1957 | Press .............................. 285/55 |
| 2,913,011 | A | * | 11/1959 | Noyes et al. ................... 138/133 |
| 3,251,612 | A | * | 5/1966 | Webbe ............................ 285/47 |
| 3,420,553 | A | * | 1/1969 | Poxon et al. ..................... 285/49 |
| 3,434,869 | A | | 3/1969 | Davidson |
| 3,508,946 | A | | 4/1970 | Plueddemann et al. |
| 3,552,445 | A | | 1/1971 | Andrews |
| 3,561,493 | A | | 2/1971 | Maillard et al. |
| 3,665,968 | A | | 5/1972 | De Putter |
| 3,913,625 | A | * | 10/1975 | Gazda et al. ................... 138/140 |
| 4,137,949 | A | | 2/1979 | Linko, III et al. |
| 4,158,371 | A | | 6/1979 | Reusser et al. |
| 4,190,088 | A | | 2/1980 | Lalikos et al. |
| 4,259,989 | A | | 4/1981 | Lalikos et al. |
| 4,272,643 | A | | 6/1981 | Carroll et al. |
| 4,275,769 | A | | 6/1981 | Cooke |
| 4,340,090 | A | | 7/1982 | Matsushita et al. |
| 4,341,842 | A | | 7/1982 | Lampe |
| 4,367,889 | A | | 1/1983 | Redl |

(Continued)

FOREIGN PATENT DOCUMENTS

| | | |
|---|---|---|
| EP | 0805903 A1 | 11/1997 |
| GB | 1178852 A | 1/1970 |

(Continued)

OTHER PUBLICATIONS

Stratoflex 101 PTFE Lightweight, Enhanced Bend Radius Hose Products for the Aerospace Industry, Catalogue 106-101, Aug. 2001, published by the Stratoflex Division of Parker Hannifin Corporation, Fort Worth.

(Continued)

*Primary Examiner* — Phutthiwat Wongwian
(74) *Attorney, Agent, or Firm* — Edwards Wildman Palmer LLP; Scott D. Wofsy; Joshua L. Jones (57) ABSTRACT

A fuel manifold for distributing fuel to a gas turbine engine includes a plurality of interconnected manifold segments. Each manifold segment extends between a pair of fuel injector inlet fittings. Each manifold segment includes a fuel liner defining an internal fuel passage therethrough fluidly connecting a pair of fuel injector inlet fittings. A wire braid layer surrounds the fuel liner, a fire sleeve surrounds the wire braid layer, and a flexible thermal shield surrounds the fire sleeve. An insulation space is defined between the fire sleeve and the thermal shield to thermally isolate the fire sleeve from conditions external to the thermal shield.

15 Claims, 9 Drawing Sheets

(56) References Cited

U.S. PATENT DOCUMENTS

| | | |
|---|---|---|
| 4,452,279 A | 6/1984 | Atwell |
| 4,467,610 A | 8/1984 | Pearson et al. |
| 4,488,577 A | 12/1984 | Shilad et al. |
| 4,509,559 A * | 4/1985 | Cheetham et al. ............ 138/121 |
| 4,510,348 A | 4/1985 | Arroyo et al. |
| 4,611,832 A | 9/1986 | Matsuoka et al. |
| 4,675,221 A | 6/1987 | Lalikos et al. |
| 4,708,371 A | 11/1987 | Elsworth et al. |
| 4,823,845 A | 4/1989 | Martin et al. |
| 4,942,903 A | 7/1990 | Jacobsen |
| 5,076,329 A | 12/1991 | Brunnhofer |
| 5,103,816 A | 4/1992 | Kirschbaum et al. |
| 5,167,259 A | 12/1992 | Brunnhofer |
| 5,183,079 A | 2/1993 | Blin |
| 5,197,288 A | 3/1993 | Newland et al. |
| 5,223,571 A | 6/1993 | Igarashi et al. |
| 5,231,833 A | 8/1993 | MacLean et al. |
| 5,284,184 A | 2/1994 | Noone et al. |
| 5,383,087 A | 1/1995 | Noone et al. |
| 5,390,273 A | 2/1995 | Rahman et al. |
| 5,419,374 A | 5/1995 | Nawrot et al. |
| 5,460,771 A | 10/1995 | Mitchell et al. |
| 5,469,892 A | 11/1995 | Noone et al. |
| 5,478,171 A * | 12/1995 | Tassone et al. ............ 405/154.1 |
| 5,500,257 A | 3/1996 | Krause et al. |
| 5,554,425 A | 9/1996 | Krause et al. |
| 5,566,266 A | 10/1996 | Nave et al. |
| 5,566,720 A | 10/1996 | Cheney et al. |
| 5,571,625 A | 11/1996 | Porte et al. |
| 5,580,186 A * | 12/1996 | Tassone et al. ............ 405/154.1 |
| 5,608,963 A | 3/1997 | Lefere |
| 5,622,210 A | 4/1997 | Crisman et al. |
| 5,678,611 A | 10/1997 | Noone et al. |
| 5,743,304 A | 4/1998 | Mitchell et al. |
| 5,799,705 A | 9/1998 | Friedrich et al. |
| 5,805,942 A | 9/1998 | Brock et al. |
| 6,064,000 A | 5/2000 | Kim |
| 6,070,615 A | 6/2000 | Chen |
| 6,334,466 B1 | 1/2002 | Jani et al. |
| 6,390,141 B1 | 5/2002 | Fisher et al. |
| 6,425,821 B1 | 7/2002 | Koerber et al. |
| 6,479,161 B1 | 11/2002 | Araki et al. |
| 6,516,142 B2 | 2/2003 | Grant et al. |
| 6,599,997 B2 | 7/2003 | Araki et al. |
| 6,641,884 B1 | 11/2003 | Martucci et al. |
| 6,711,329 B2 | 3/2004 | Zelesnik |
| 6,742,545 B2 | 6/2004 | Fisher et al. |
| 6,776,195 B2 | 8/2004 | Blasko et al. |
| 6,807,988 B2 | 10/2004 | Powell et al. |
| 6,817,082 B2 * | 11/2004 | Grepaly et al. ............ 29/516 |
| 7,568,344 B2 | 8/2009 | Lincourt |
| 8,127,800 B2 * | 3/2012 | Ramaswamy et al. ........ 138/149 |
| 8,176,943 B2 * | 5/2012 | Stroempl et al. ............ 138/137 |
| 2004/0134555 A1 | 7/2004 | Powell et al. |
| 2006/0100328 A1 | 5/2006 | Goossens |
| 2006/0151043 A1 | 7/2006 | Nanney et al. |
| 2006/0201566 A1 | 9/2006 | Brink et al. |
| 2007/0079885 A1 | 4/2007 | Zaborszki et al. |
| 2011/0000572 A1 | 1/2011 | Ramaswamy et al. |

FOREIGN PATENT DOCUMENTS

| | | |
|---|---|---|
| GB | 2325728 A | 12/1998 |
| JP | 11051289 A | 2/1999 |
| JP | 11131631 A | 5/1999 |
| WO | WO-2006/073415 A1 | 7/2006 |

OTHER PUBLICATIONS

Stratoflex Fire Testing of Aerospace Hose, Catalogue 106-FR, Jun. 2001, published by the Stratoflex Division of Parker Hannifin Corporation, Fort Worth, Texas.

Smiths Tubular Systems 130/180 Series Product Catalog.

* cited by examiner

HIGH TEMPERATURE MANIFOLDS FOR GAS TURBINE ENGINES

BACKGROUND OF THE INVENTION

1. Field of the Invention

The present invention relates to fluid distribution manifolds, and more particularly to high temperature fuel manifolds for gas turbine engines.

2. Description of Related Art

The fuel manifold system of a gas turbine engine distributes fuel from a fuel control system to a plurality of fuel injectors mounted on the engine case. The fuel injectors are configured to issue atomized fuel into the combustor of the engine. It is well known that combustor inlet air temperatures can be extremely high (e.g., 1300° F., 704.4° C.), and the combustion of fuel drives temperatures even higher. High combustor temperatures are necessary in order to fully ignite the fuel and to derive the maximum amount of energy available from the burning fuel in a turbine, and often a nozzle, located downstream of the combustor. Under basic thermodynamic principals, increasing the temperature and/or pressure of combustion gases increases the amount of useful energy that can be produced. As gas turbine engine technologies have advanced, higher and higher operating temperatures have become possible, making for increasingly powerful and efficient engines.

The high operating temperatures in modern gas turbine engines put a tremendous thermal strain on engine components associated with the combustor casing. These engine components must structurally accommodate thermal expansion and contraction of the combustor casing during engine operating cycles. There is a particularly high gradient of thermal expansion at the fuel manifold, where the internal fuel temperature is relatively low compared to the external gas temperatures. A combustor easing is typically around room temperature prior to engine start up, and then heats up to a high operating temperature during high power engine operation, such as during takeoff. While the combustor casing expands and contracts considerably with these thermal cycles of the engine, the fuel manifold undergoes comparatively little thermal expansion due to the relatively cool fuel flowing through it. This cycling difference in thermal expansion between the engine case and fuel manifold must be accommodated to avoid stress related failures.

Traditionally, thermal expansion of the combustor case has been accommodated by using curved metal tubes to flexibly connect the fuel lines of the manifold assembly to the fuel injectors. An example of a fuel manifold assembly that includes curved metal tubes is shown in U.S. Pat. No. 5,197,288 to Newland et al. Prior art designs of this type have certain disadvantages such as susceptibility to vibration and fatigue.

Another solution has been to use flexible hoses to connect between injector fixtures of the manifold assembly to accommodate thermal expansion. The United States Military Defense Standards MIL-DTL-25579 establishes an upper limit of 450° F. (232.2° C.) for the air around a flexible fuel manifold in a gas turbine engine. However, today's high performance gas turbine engines have air temperatures outside the engine case that far exceed that standard. Typical fuel systems are expected to be able to routinely operate in temperatures in excess of 800° F. (426.67° C.).

Additionally, the Federal Aviation Authority (FAA) requires that commercial engine fuel systems undergo a flame endurance test to ensure that the fuel systems can safely operate even under prolonged exposure to flames. Exposure to flames can compromise fuel manifold hoses. It is known to provide a fire sleeve around the hose portions of such manifolds to improve flame resistance. However as gas turbine technology advances, the operating temperatures continue to rise to levels that can compromise even hoses with conventional fire sleeves.

One solution to this problem has been to utilize a telescoping outer wall outside the fire sleeve, as disclosed in U.S. Pat. No. 4,467,610 to Pearson et al. While this may improve the ability of a manifold to endure high temperatures and flames, such mechanisms add to the cost and mechanical complexity of flexible hose type fuel manifolds.

Such conventional methods and systems have generally been considered satisfactory for their intended purpose. However, there is still a need in the art for fuel manifolds that allow for improved high temperature operation and flame resistance. There also remains a need in the art for such manifolds that are easy to make and use. The present invention provides a solution for these problems.

SUMMARY OF THE INVENTION

The subject invention is directed to a new and useful fuel manifold for distributing fuel to a gas turbine engine. The fuel manifold includes a plurality of interconnected manifold segments. Each manifold segment extends between a pair of fuel injector inlet fittings. Each manifold segment includes a fuel liner defining an internal fuel passage therethrough fluidly connecting a pair of fuel injector inlet fittings. A wire braid layer surrounds the fuel liner, a fire sleeve surrounds the wire braid layer, and a flexible thermal shield surrounds the fire sleeve. An insulation space is defined between the fire sleeve and the thermal shield to thermally isolate the fire sleeve from conditions external to the thermal shield.

In certain embodiments, the insulation space can be substantially sealed off. The insulation space can be filled with a gas, and a vent, valve, or the like can be included in the thermal shield to allow venting of hot gases from the insulation space. It is also contemplated that the insulation space can be substantially evacuated.

In accordance with certain embodiments, the thermal shield includes a corrugated metal tube. It is contemplated that in some embodiments, the thermal shield can include an outer metal foil surrounding a fiberglass cloth layer. Such a thermal shield can be a stitched sleeve that includes a lengthwise stitched seam joining lengthwise edges of the outer metal foil and fiberglass cloth layer. In accordance with certain embodiments, the thermal shield includes a stripwound metal hose. It is contemplated that the fire sleeve can include a layer of high temperature fiberglass insulation. The fire sleeve can include an AS1072 silicone rubber coated fiber glass fire sleeve.

In accordance with certain embodiments, a layer of solid state insulation material is included between the fire sleeve and the thermal shield. The thermal shield and the layer of solid state insulation material are configured and adapted to thermally isolate the fire sleeve from conditions external to the thermal shield. The thermal shield can include two longitudinal sections joined at a pair of lengthwise seams, and the layer of solid state insulation material can include two longitudinal sections joined at a pair of lengthwise seams.

The invention also provides a segment of a fluid manifold. The segment includes a liner defining an internal fluid passage therethrough fluidly connecting a pair of hose fitting inserts. A wire braid layer surrounds the liner, and a flexible thermal shield is included outboard of the wire braid layer. An insulation space is defined inboard of the thermal shield and outboard of the wire braid layer to provide thermal isolation from conditions external to the insulation space and thermal shield.

In certain embodiments, a fire sleeve surrounds the wire braid layer, and the insulation space is defined between the fire sleeve and the thermal shield. The thermal shield can include a corrugated metal tube welded to each hose fitting insert. It is also contemplated that the thermal shield can include a convoluted metal tube joined to each hose fitting insert by a metal band clamp. In certain embodiments, the thermal shield includes a stripwound metal hose connected at each end to a respective hose fitting insert by a threaded nut having threads which intermesh with the stripwound metal hose.

In accordance with certain embodiments, the thermal shield includes an outer metal foil surrounding a fiberglass cloth layer that together are a stitched sleeve that includes a lengthwise stitched seam joining free edges of the outer metal foil and fiberglass cloth layer. The stitched sleeve is clamped at each end to the fire sleeve by a respective metal band clamp.

In some embodiments, the thermal shield includes two longitudinal sections joined to one another at a pair of lengthwise seams that are spot welded together. The insulation space includes a layer of solid state insulation having two longitudinal sections joined at a pair of lengthwise seams. The longitudinal sections can be joined with room-temperature vulcanization ("RTV") sealant applied at the inner diameter of the lengthwise seam. The thermal shield and layer of solid state insulation are clamped at each end to the fire sleeve by a respective metal band clamp.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 3:
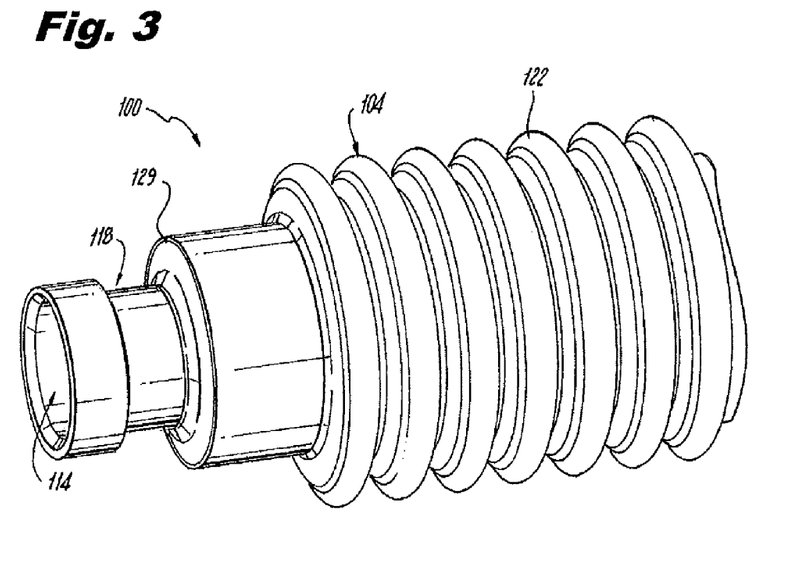
FIG. 3 is a perspective view of a portion of an exemplary embodiment of a manifold segment constructed in accordance with the present invention, showing the hose fitting and thermal shield.

Reference will now be made to the drawings wherein like reference numerals identify similar structural features or aspects of the subject invention. For purposes of explanation and illustration, and not limitation, a partial view of an exemplary embodiment of a manifold in accordance with the invention is shown in FIG. 3 and is designated generally by reference character 100. Other embodiments of manifolds in accordance with the invention, or aspects thereof, are provided in FIGS. 4-19, as will be described. The system of the invention can be used to improve high temperature operation and flame resistance, for example in fuel manifolds of gas turbine engines.

Figures 1, 2A, 2B:
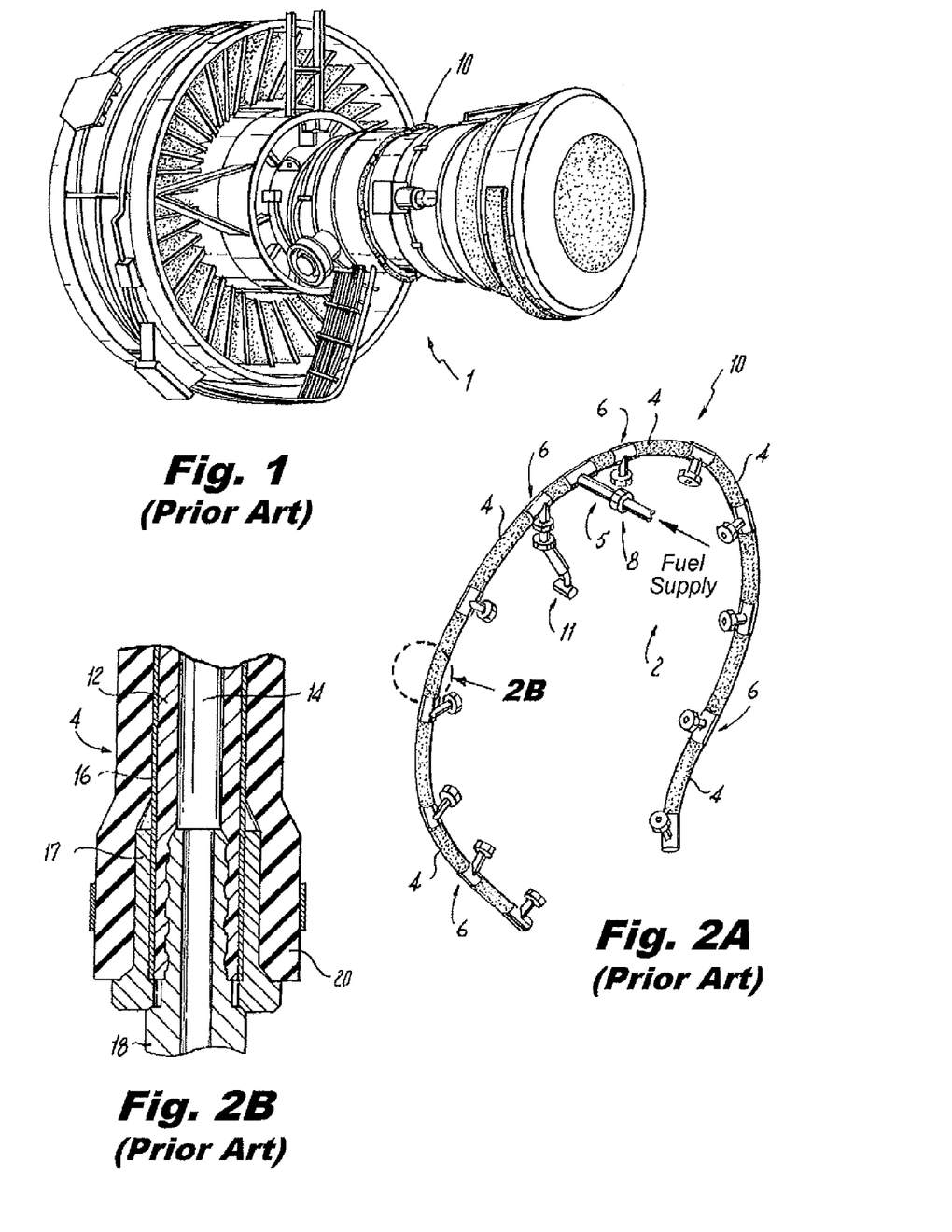
FIG. 1 is a perspective view of a prior art gas turbine engine, showing the location of the fuel manifold.
FIG. 2a is a perspective view of a prior art fuel manifold for a gas turbine engine.
FIG. 2b is a cross-sectional side elevation view of a portion of the fuel manifold of FIG. 2a, showing the fire sleeve around a manifold segment.

Referring now to FIG. 1, an exemplary gas turbine engine 1 is shown with fuel manifold 10 disposed around the central portion of engine 1 proximate the combustor. FIG. 2A shows fuel manifold 10 in greater detail. Fuel manifold 10 includes a fuel inlet 2 connected to a series of flexible hose manifold segments 4 connected together for distributing fuel in a gas turbine engine. Each manifold segment 4 extends between a pair of fuel injector inlet fittings 6. One manifold segment 5 includes a T-fitting 8 where fuel inlet 2 connects to manifold 10. Each inlet fitting 6 is adapted to connect to a fuel injector 11.

Referring now to FIG. 2B, each manifold segment 4 includes a fuel liner 12 defining an internal fuel passage 14 therethrough fluidly connecting a pair of fuel injector inlet fittings 6 (not shown in FIG. 2B, but see FIG. 2A). A wire braid layer 16 surrounds fuel liner 12. Wire braid layer 16 is attached at each end to a hose fitting insert 18 by a crimp collar 17. This secures fuel liner 12 and wire braid layer 16 to the respective hose fitting inserts 18. Hose fitting insert 18 fits for attachment to a respective injector inlet fitting 6. A fire sleeve 20 surrounds wire braid layer 16. Fire sleeve 20 is of a silicone rubber material that includes a layer of high temperature fiberglass insulation, for example, as in AS1072 Type 2 fire sleeve. It is also possible to use a silicone rubber fire sleeve without fiberglass insulation.

Figure 4:
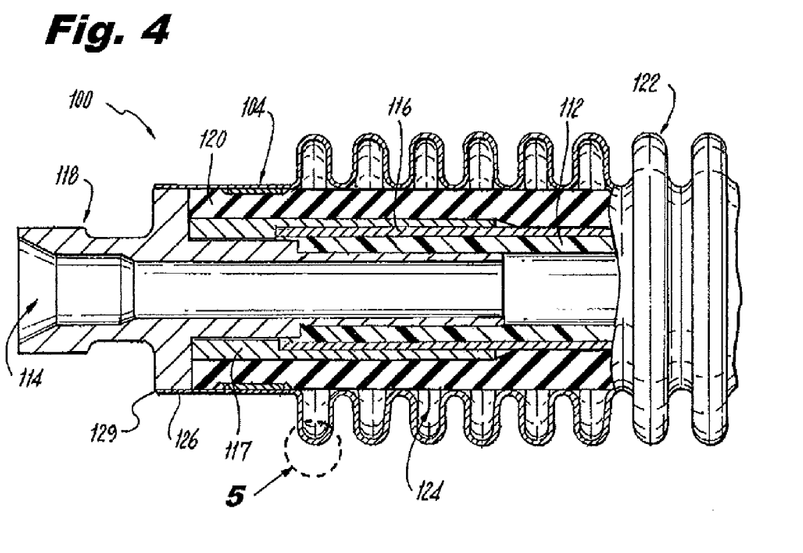
FIG. 4 is a cross-sectional side elevation view of the manifold segment of FIG. 3, showing the thermal shield and insulation space.

Making reference now to FIGS. 3-4, exemplary segments 104 of manifold 100 in accordance with the present invention can be used, for example, in place of traditional segments 4 in a manifold as shown in FIG. 1 to achieve the improvements described above. As shown in FIG. 3, segment 104 includes a fuel liner 112 with a fuel passage 114 therethrough, wire braid layer 116, hose fitting insert 118, and fire sleeve 120, as described above. Flexible thermal shield 122 surrounds fire sleeve 120, as shown in FIG. 3. An insulation space 124, shown in FIG. 4, is defined between fire sleeve 120 and thermal shield 122 to thermally isolate fire sleeve 120, and everything inboard thereof, from conditions external to thermal shield 122. Thermal shield 122 includes a corrugated metal tube, which lends flexibility to thermal shield 122 and to manifold segment 104 overall. This flexibility allows for manifold 100 to be manipulated into place on an engine during installation, for example, as well as allowing accommodation of differential thermal expansion within an engine as described above.

Figure 5:
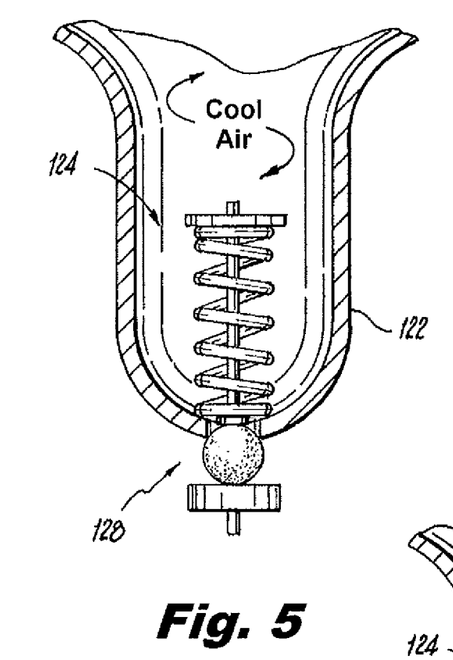
FIG. 5 is a cross-sectional side elevation view of a portion of the thermal shield of FIG. 4, showing an optional valve for venting the insulation space, wherein the valve is in a closed position.
Figure 6:
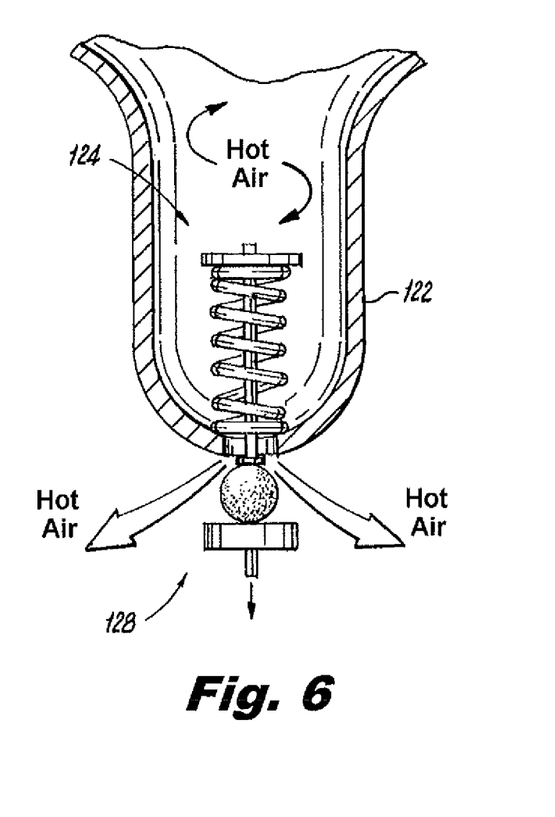
FIG. 6 is a cross-sectional side elevation view of the optional valve of FIG. 5, showing the valve in an open position.

Each end of thermal shield 122 includes a cylindrical portion 126 that is fillet welded to hose fitting insert 118 at weld 129. This manner of attachment seals insulation space 124, which can contain a gas such as air or a noble gas, or which can be evacuated. If a gas is used in insulation space 124, an optional ball check valve 128, as shown in FIG. 5, can be included in thermal shield 122 to allow venting of hot gas from insulation space 124, as indicated by arrows in FIG. 6, while preventing external fluids, such as fuel, entering insulative gap 124. Any other suitable valve type or venting means can be used without departing from the spirit and scope of the invention.

Figure 7:
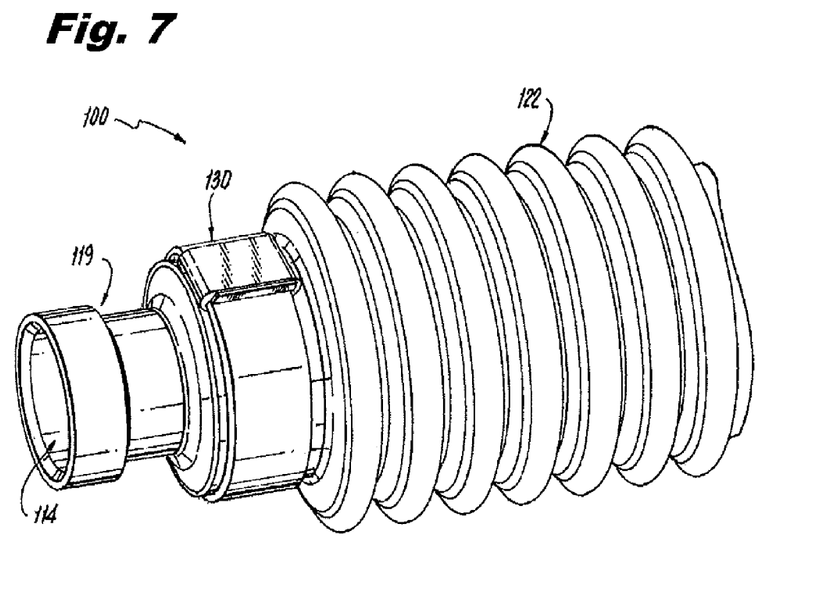
FIG. 7 is a perspective view of a portion of another exemplary embodiment of a manifold segment constructed in accordance with the present invention, showing the hose fitting and thermal shield attached thereto with a band clamp.
Figure 8:
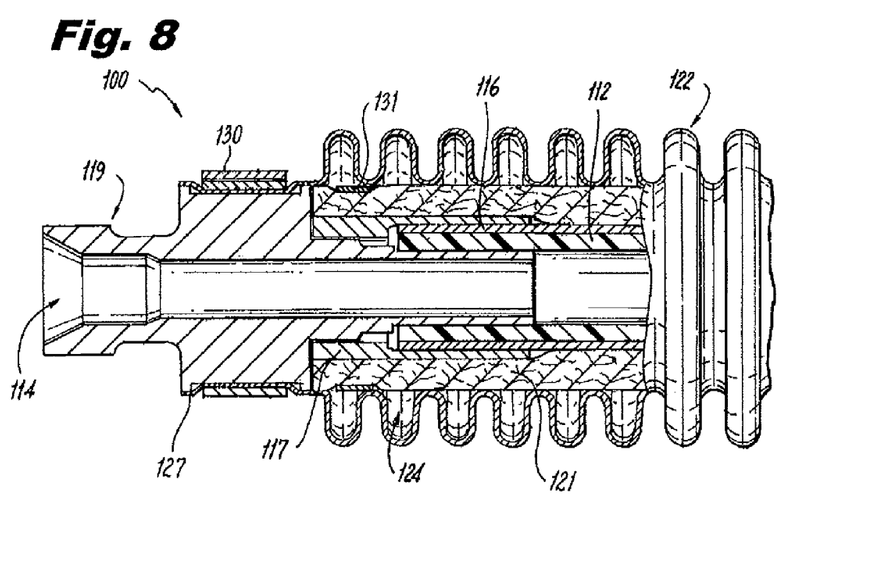
FIG. 8 is a cross-sectional side elevation view of the manifold segment of FIG. 7, showing the insulation space inboard of the thermal shield.

Referring now to FIG. 7, thermal shield 122 can optionally be configured with a cylindrical portion 127 that is clamped to a hose fitting insert 119 using a band clamp 130 in addition to or in lieu of fillet welding as described above. Fitting insert 119 includes an elongated attachment portion for receiving band clamp 130, as shown in the cross-section of FIG. 8. This manner of attachment can provide a light seal to the insulative space 124 that can allow some venting thereof with minimal or no liquid ingress. Those skilled in the art will readily appreciate that any suitable attachment can be used for thermal shield 122 without departing from the spirit and scope of the invention. As shown in FIG. 8, a fiberglass insulation layer 121 can optionally be used in lieu of a traditional silicone rubber coated fiber glass sleeve, as in fire sleeve 120 of FIG. 4. Tape 131, such a self-sealing silicone tape, can optionally be used to maintain the position of layer 121 during assembly. Both fiberglass insulation layer 121 and fire sleeve 120 can optionally be used together if desirable for a given application.

Figure 9:
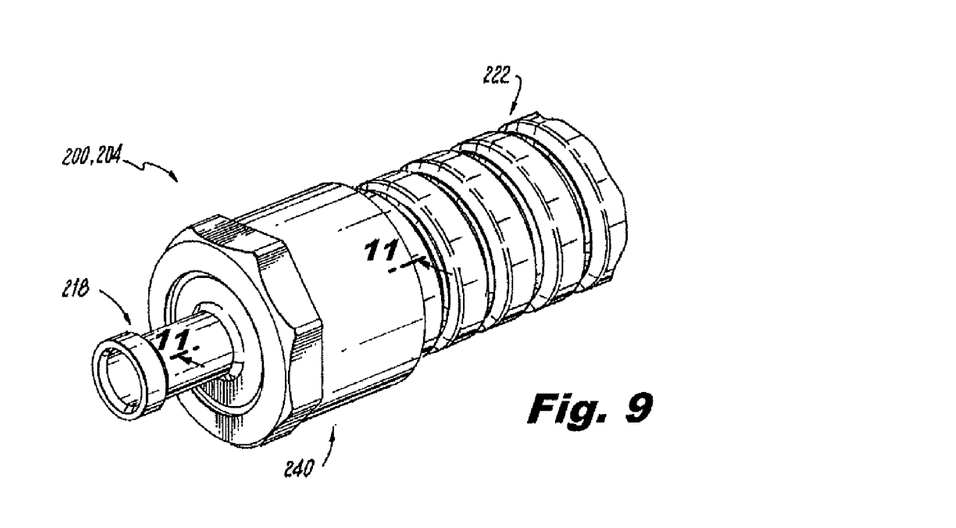
FIG. 9 is a perspective view of a portion of another exemplary embodiment of a manifold segment constructed in accordance with the present invention, showing a stripwound metal hose thermal shield attached to a hose fitting with a threaded nut that intermeshes with the stripwound metal hose.
Figure 10:
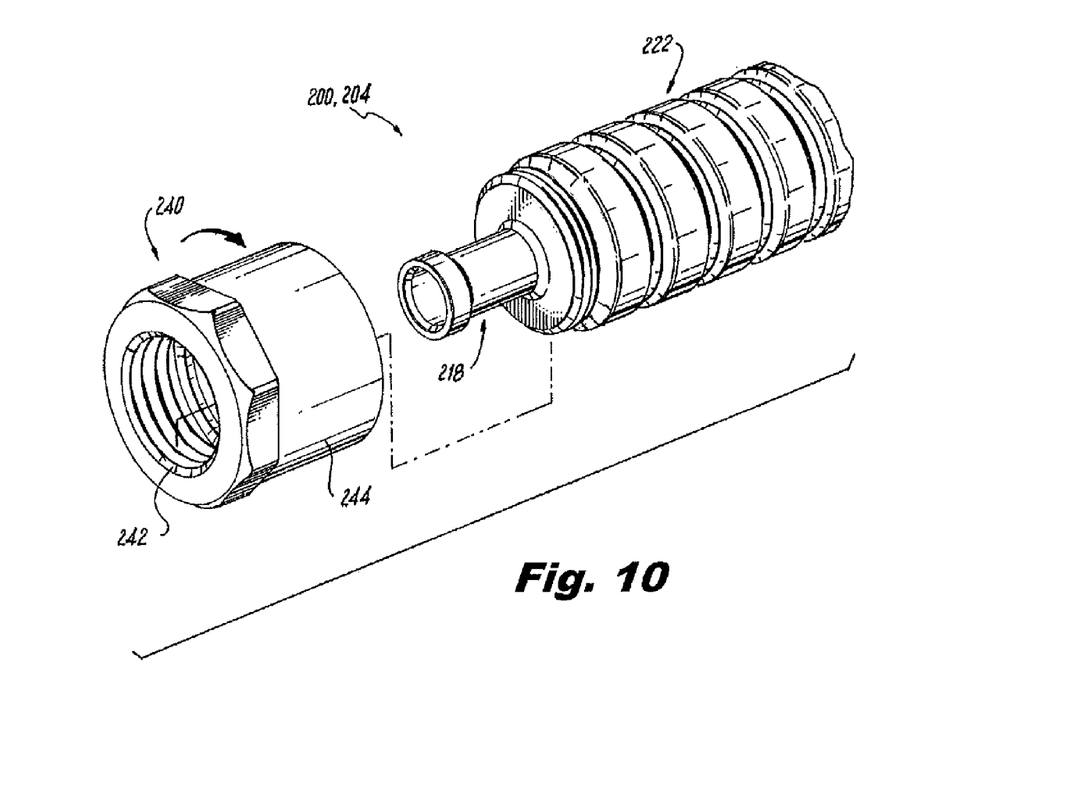
FIG. 10 is an exploded perspective view of the manifold segment of FIG. 9, showing the threaded nut removed from the manifold segment.
Figure 11:
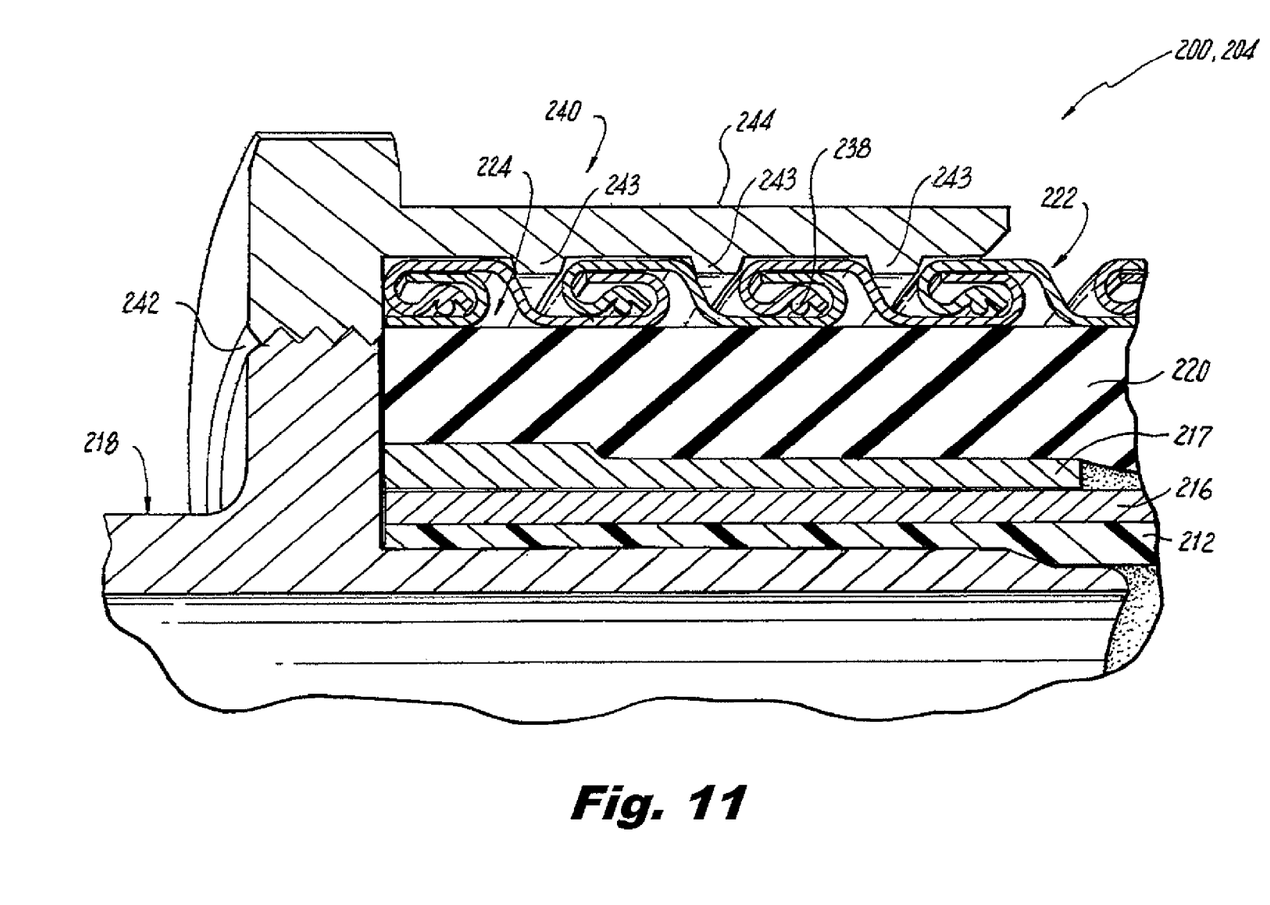
FIG. 11 is a cross-sectional side elevation view of a portion of the manifold segment of FIG. 9, showing the insulation space inboard of the thermal shield, and showing the intermeshing engagement of the threaded nut and stripwound metal hose.

With reference now to FIGS. 9-11, a further example of a segment 204 of another exemplary embodiment of a fuel manifold 200 is shown. As shown in FIG. 11, segment 204 includes fuel liner 212, wire braid layer 216, crimp collar 217, fire sleeve 220, insulative gap 224, and hose fitting insert 218 much as those descried above with respect to fuel manifold 100. Thermal shield 222 includes a flexible stripwound metal hose. The overlapping portion of the coils of the stripwound hose include a seal 238 in the form of a helical wire packing, which can be of stainless steel, for example. Those skilled in the art will readily appreciate that any other seal configuration can be used in the coils of the stripwound metal hose without departing from the spirit and scope of the invention. Suitable stripwound metal hoses include those available from Precision Hose, Inc. of Stone Mountain, Ga.

Thermal shield 222 is connected at each end to a respective hose fitting insert 218 by a threaded nut 240, as shown in FIG. 9. Threaded nut 240 has internal threads 243 which intermesh with the coils of the stripwound metal hose of thermal shield 222, as shown in FIG. 11. Additional threads 242 attach nut 240 to hose fitting insert 218, which has corresponding threads as shown in FIG. 10. To increase the engagement of nut 240 to thermal shield 222, cylindrical portion 244 of nut 240 can be crimped inward to prevent nut 240 coming unthreaded due to vibrations, for example.

Figures 12, 13:
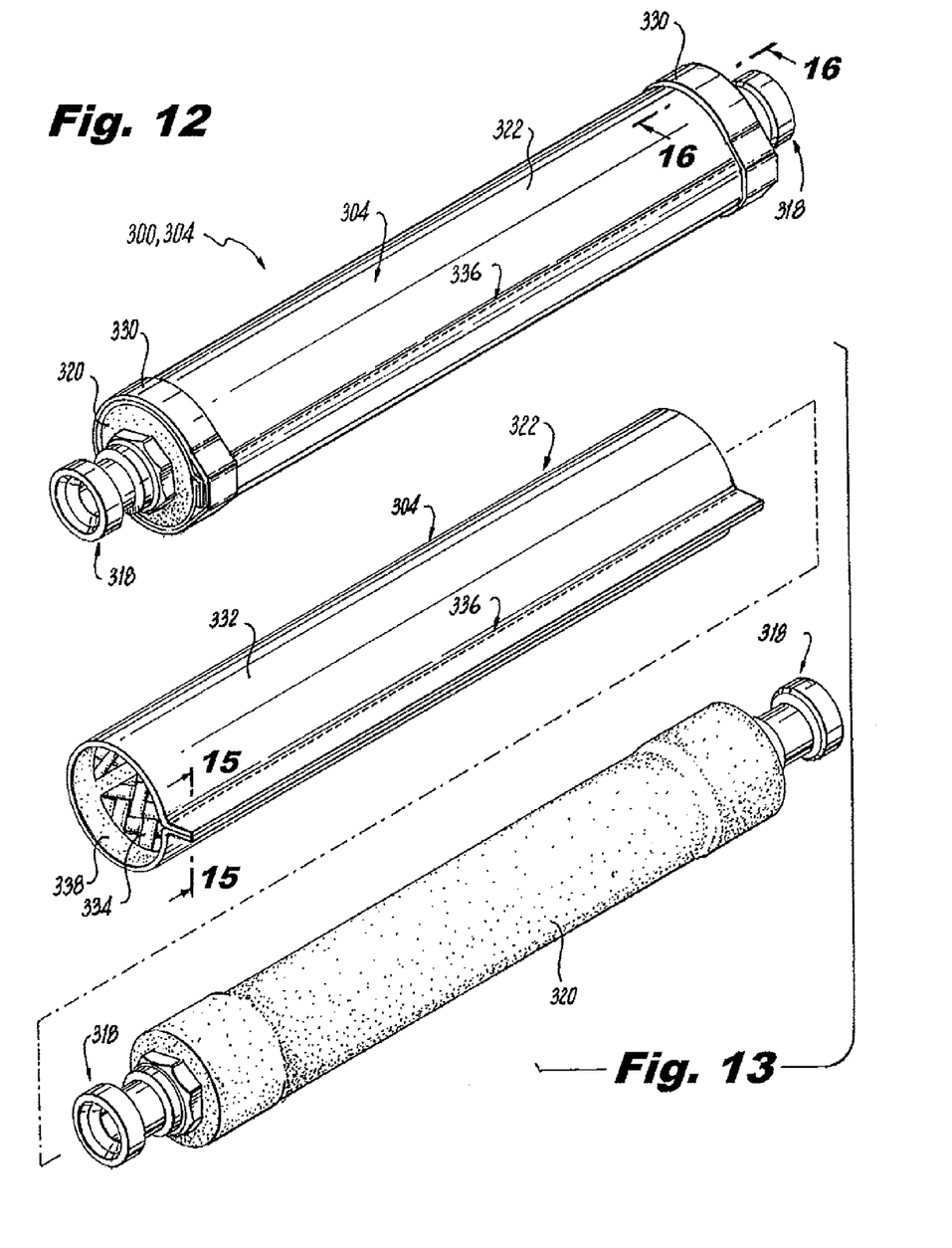
FIG. 12 is a perspective view of another exemplary embodiment of a manifold segment constructed in accordance with the present invention, showing the hose fitting and stitched sleeve thermal shield.
FIG. 13 is an exploded perspective view of the manifold segment of FIG. 12, showing the stitched sleeve removed from the fire sleeve.
Figures 14, 15:
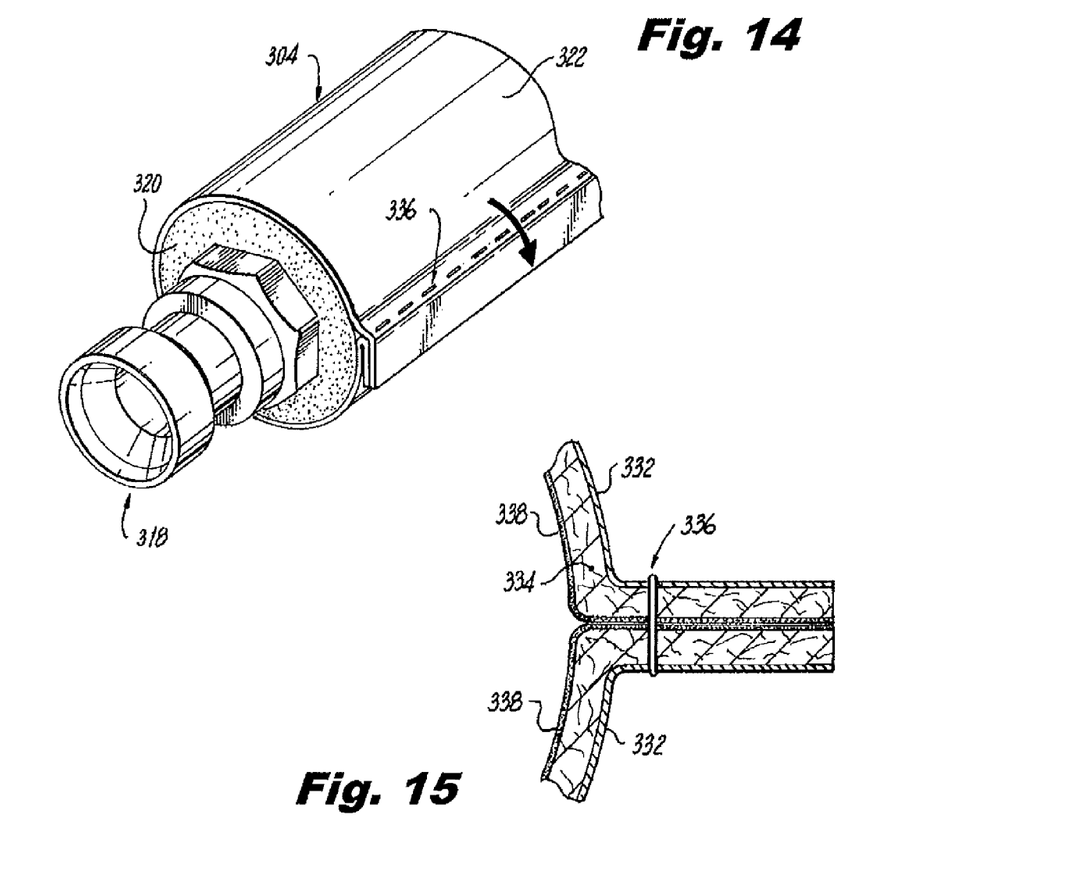
FIG. 14 is a perspective view of a portion of the manifold segment of FIG. 12, showing the end of the stitched seam of the thermal shield folded downward in preparation to receive the band clamp.
FIG. 15 is a cross-sectional end view of a portion of the stitched sleeve of FIG. 12, showing the stitched seam.
Figure 16:
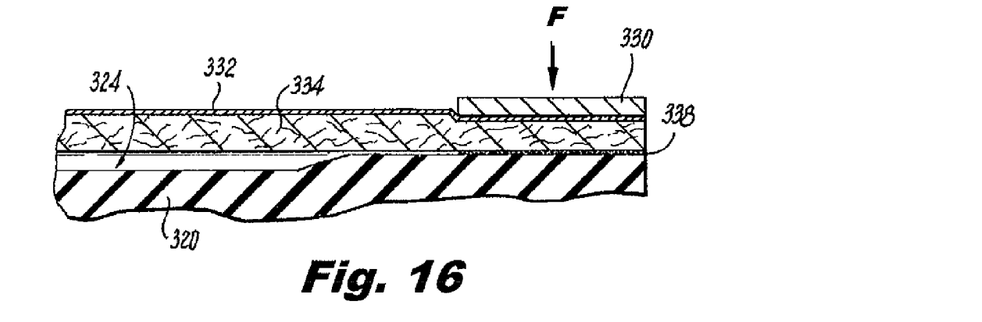
FIG. 16 is a cross-sectional side elevation view of a portion of the manifold segment of FIG. 12, showing the insulation space inboard of the thermal shield.

Referring now to FIG. 12, a segment 304 of another exemplary embodiment of a fuel manifold 300 is shown, including a fuel liner, wire braid layer, and crimp collar that are not shown, but see, e.g., fuel liner 212, wire braid layer 216, and crimp collar 217 in FIG. 11. As shown in FIG. 16, segment 304 also includes a fire sleeve 320, an insulative gap 324, and a hose fitting insert 318 (shown in FIGS. 12-14) much as those descried above with respect to fuel manifolds 100 and 200.

As shown in FIG. 13, thermal shield 322 includes an outer metal foil 332 surrounding a fiberglass cloth layer 334, such as in the metallic coated fiberglass sleeves available from ADL Insuflex, Inc. of Ontario, Canada. Thermal shield 322 is a stitched sleeve that includes a lengthwise stitched seam 336, shown in cross-section in FIG. 15, joining lengthwise edges of outer metal foil 332 and fiberglass cloth layer 334. A room-temperature vulcanized rubber ("RTV") coating 338 is included around the edges of thermal shield 322 to seal seam 336 and the ends of thermal shield 322 when affixed to fire sleeve 320 of segment 304. Seam 336 is stitched with a high temperature thread.

A metal band clamp 330 attaches each end of thermal shield 322 to fire sleeve 320 by compression, as indicated by the arrow labeled "F" in FIG. 16 to retain thermal shield 322 in place. The ends of each seam 336 can be folded inward onto the outer surface of thermal shield 322, as indicated by the arrow in FIG. 14, to accommodate band clamp 330 without compromising seams 336. One or more additional clamps or ties can optionally be used along the middle portion of segment 304 to tie down the middle portion of seam 336. Any gaps in seam 336 or in the ends of segment 304 can be sealed with high temperature silicone RTV.

Figures 17, 18, 19:
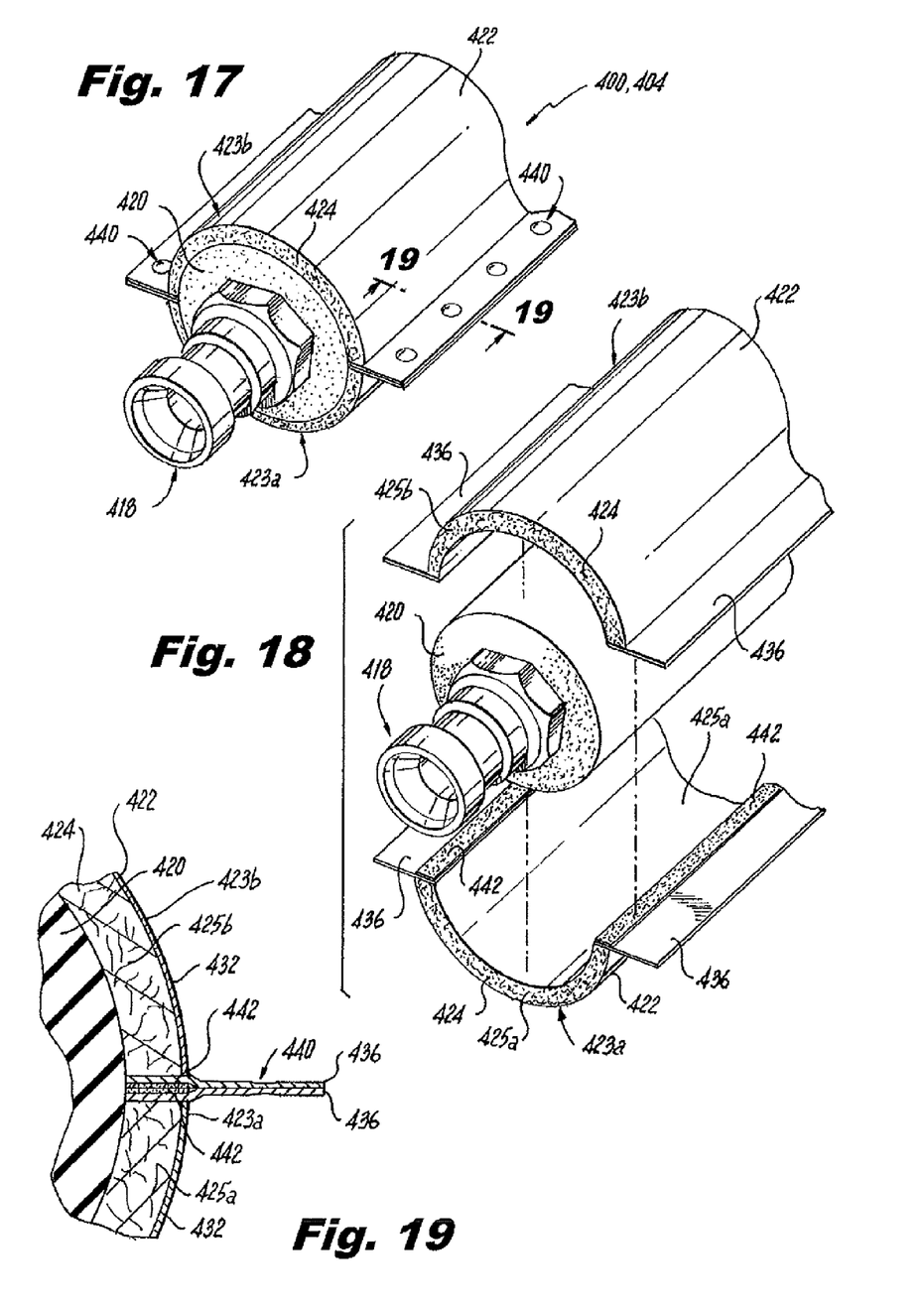
FIG. 17 is a perspective view of a portion of another exemplary embodiment of a manifold segment constructed in accordance with the present invention, showing the hose fitting and spot welded thermal shield.
FIG. 18 is an exploded perspective view of the manifold segment of FIG. 17, showing the two longitudinal sections of the thermal shield and solid state insulation spaced apart from the fire sleeve.
FIG. 19 is a cross-sectional end view of a portion of the manifold segment of FIG. 17, showing the spot welds and longitudinal seals where the longitudinal sections of the thermal shield and solid state insulation are joined.

Referring now to FIG. 17, a portion of a segment 404 of another exemplary embodiment of a fuel manifold 400 is shown, including a fuel liner, wire braid layer, crimp collar, fire sleeve 420 and hose fitting insert 418 much as those descried above with respect to fuel manifold 100. Hose fitting inserts 318 and 418 described above can advantageously be standard hose fittings and thereby reduce manufacturing cost.

As shown in FIG. 18, a layer of solid state insulation material 424 is included between fire sleeve 420 and the thermal shield 422, which is a foil. Insulation material 424 substantially fills the insulation space between thermal shield 422 and fire sleeve 420, as shown in FIG. 19. Thermal shield 422 and insulation material 424 thermally isolate fire sleeve 420, and everything inboard thereof, from conditions external to thermal shield 422.

With reference now to FIG. 18, thermal shield 422 includes two longitudinal sections 423a, 423b that are joined at a pair of lengthwise flanges that form seams 436. Insulation material 424 similarly includes two longitudinal sections 425a, 425b joined at a pair of lengthwise seams. Sections 425a, 425b of insulation material 424 are optionally adhered to corresponding sections 423a, 423b of thermal shield 422 for ease of assembly. It is advantageous for ease of assembly for sections 425a, 425b of insulation material 424 to approximate the size and shape of fire sleeve 420 prior to installation. The combined sections of insulation material 424 and thermal shield 422 can be assembled onto manifold segment 404 by positioning them onto fire sleeve 420 and spot welding along each lengthwise seam 436 of thermal shield 422. The spot welds 440 are shown in FIGS. 17 and 19. A high temperature RTV longitudinal seal 442 is included in each seam 436 to provide sealing against ingress of liquids or gases. This can be accomplished, for example, by placing a bead of high temperature silicone RTV in the inner diameter of seams 436 next to fire sleeve 420 during assembly. Each end of seams 436 can be bent inward to conform against the outer surface of shield 422 and then the each end of manifold segment 404 is clamped with a metal band clamp (not shown, but see, e.g., FIG. 12) to secure thermal shield 422, insulation material 424, and fire sleeve 420 to segment 404, much as described above with reference to segment 304.

While described above with an exemplary embodiment having two respective longitudinal sections 423a, 423b and 425a, 425b of shielding and insulation, those skilled in the art will readily appreciate that any suitable number of longitudinal sections can be used, including one single section, e.g., as in segment 300 described above, or three or more sections, without departing from the spirit and scope of the invention. The number of sections of insulation material need not be the same as the number of sections of shielding. Moreover, while the exemplary segment 400 has respective longitudinal sections of insulation and shielding that are circumferentially aligned with one another to meet at common seams, such alignment is optional and the longitudinal seams of the insulation material and shielding can be misaligned if desired without departing from the spirit and scope of the invention.

While the description above provides exemplary materials for the various components, those skilled in the art will readily appreciate that any suitable materials can be used for the various components without departing from the spirit and scope of the invention. Moreover, while manifold segments have been described above in the exemplary context of fuel manifolds for gas turbine engines, those skilled in the art will readily appreciate that manifolds or segments as described above can be used in any suitable application without departing from the spirit and scope of the invention. For example, fluid manifold segments in accordance with the invention can be used advantageously in hydraulic lines in high temperature environments, or in environments with potential fire risk.

The methods and systems of the present invention, as described above and shown in the drawings, provide for flexible fuel manifolds and fluid manifold segments with superior properties including high temperature operation and flame resistance, while maintaining flexibility to handle thermal expansion and contraction. Moreover, the examples provided above have the additional advantage of preventing unwanted ingress of liquids such as fuel into the manifold segments. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A fuel manifold for distributing fuel to a gas turbine engine comprising:
   a plurality of interconnected manifold segments, each manifold segment extending between a pair of fuel injector inlet fittings, each manifold segment including:
   a fuel liner defining an internal fuel passage therethrough fluidly connecting a pair of fuel injector inlet fittings;
   a wire braid layer surrounding the fuel liner;
   a fire sleeve surrounding the wire braid layer; and
   a flexible thermal shield surrounding the fire sleeve, wherein an insulation space is defined between the fire sleeve and the thermal shield to thermally isolate the fire sleeve from conditions external to the thermal shield.

2. A fuel manifold as recited in claim 1, wherein the thermal shield includes a corrugated metal tube.

3. A fuel manifold as recited in claim 2, wherein the insulation space is substantially sealed off, and wherein a vent is included in the thermal shield to allow venting of hot gases from the insulation space.

4. A fuel manifold as recited in claim 2, wherein the insulation space is substantially sealed off, and wherein the insulation space is filled with a gas.

5. A fuel manifold as recited in claim 2, wherein the insulation space is substantially sealed off, and wherein the insulation space is substantially evacuated.

6. A fuel manifold as recited in claim 1, wherein the thermal shield includes an outer metal foil surrounding a fiberglass cloth layer.

7. A fuel manifold as recited in claim 6, wherein the thermal shield is a stitched sleeve that includes a lengthwise stitched seam joining lengthwise edges of the outer metal foil and fiberglass cloth layer.

8. A fuel manifold as recited in claim 1, wherein the thermal shield includes a stripwound metal hose.

9. A fuel manifold as recited in claim 1, wherein the fire sleeve includes a layer of high temperature fiberglass insulation.

10. A fuel manifold as recited in claim 1, wherein the fire sleeve includes an AS1072 silicone rubber coated fiber glass fire sleeve.

11. A fuel manifold for distributing fuel to a gas turbine engine comprising:
    a plurality of interconnected manifold segments, each manifold segment extending between a pair of fuel injector inlet fittings, each manifold segment including:
    a fuel liner defining an internal fuel passage therethrough fluidly connecting a pair of fuel injector inlet fittings;
    a wire braid layer surrounding the fuel liner;
    a fire sleeve surrounding the wire braid layer;
    a flexible thermal shield surrounding the fire sleeve; and
    a layer of solid state insulation material between the fire sleeve and the thermal shield, wherein the thermal shield and the layer of solid state insulation material are configured and adapted to thermally isolate the fire sleeve from conditions external to the thermal shield.

12. A fuel manifold as recited in claim 11, wherein the thermal shield includes two longitudinal sections joined at a pair of lengthwise seams.

13. A fuel manifold as recited in claim 12, wherein the layer of solid state insulation material includes two longitudinal sections joined at a pair of lengthwise seams.

14. A segment of a fluid manifold comprising:
- a liner of the segment of the fluid manifold defining an internal fluid passage therethrough fluidly connecting a pair of hose fitting inserts;
- a wire braid layer surrounding the liner; and
- a flexible thermal shield outboard of the wire braid layer, wherein an insulation space is defined inboard of the thermal shield and outboard of the wire braid layer to provide thermal isolation from conditions external to the insulation space and thermal shield, wherein the thermal shield includes a stripwound metal hose connected at each end to a respective hose fitting insert by a threaded nut having threads which intermesh with the stripwound metal hose.

15. A segment of a fluid manifold as recited in claim 14, further comprising a fire sleeve surrounding the wire braid layer, wherein the insulation space is defined between the fire sleeve and the thermal shield.

\* \* \* \* \*